(12) United States Patent
Nishio et al.

(10) Patent No.: US 6,719,663 B2
(45) Date of Patent: Apr. 13, 2004

(54) VEHICULAR AUTOMATIC TRANSMISSION APPARATUS

(75) Inventors: Shinichi Nishio, Wako (JP); Hideki Takamatsu, Wako (JP); Hideki Machino, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 9 days.

(21) Appl. No.: 10/128,313

(22) Filed: Apr. 24, 2002

(65) Prior Publication Data

US 2002/0198079 A1 Dec. 26, 2002

(30) Foreign Application Priority Data

Jun. 26, 2001 (JP) ........................................ 2001-193035

(51) Int. Cl.⁷ ............................................... B60K 41/02
(52) U.S. Cl. ............................ 477/90; 477/62; 477/76; 477/168; 477/174; 192/3.29
(58) Field of Search ............................. 477/90, 62, 76, 477/86, 168, 174, 180; 192/3.29, 3.21, 3.63, 82 T

(56) References Cited

U.S. PATENT DOCUMENTS

| | | | | |
|---|---|---|---|---|
| 4,858,499 A | * | 8/1989 | Ito et al. ........................ 477/63 |
| 5,105,926 A | * | 4/1992 | Yoshimura et al. .......... 477/169 |
| 5,609,551 A | * | 3/1997 | Sakai ........................... 477/168 |
| 5,722,912 A | * | 3/1998 | Narita .......................... 477/64 |
| 5,954,618 A | * | 9/1999 | Mikami et al. .............. 477/174 |
| 5,989,156 A | * | 11/1999 | Matsubara et al. .......... 477/169 |
| 6,019,703 A | * | 2/2000 | Black et al. ................. 477/168 |
| 6,085,136 A | * | 7/2000 | Katakura et al. ............. 701/51 |
| 6,132,335 A | * | 10/2000 | Fischer ......................... 477/169 |
| 6,146,309 A | * | 11/2000 | Nishino et al. ............... 477/98 |
| 6,217,481 B1 | * | 4/2001 | Watanabe et al. ........... 477/169 |
| 6,341,679 B1 | * | 1/2002 | Abe et al. ................... 192/3.29 |
| 6,397,703 B1 | * | 6/2002 | Iijima ......................... 74/732.1 |
| 6,482,123 B2 | * | 11/2002 | Steeby ......................... 477/98 |
| 6,537,178 B1 | * | 3/2003 | Takizawa et al. ............. 477/76 |

FOREIGN PATENT DOCUMENTS

JP          61-135881          6/1986

* cited by examiner

*Primary Examiner*—Rodney H. Bonck
*Assistant Examiner*—David D. Le
(74) *Attorney, Agent, or Firm*—Westerman, Hattori, Daniels & Adrian, LLP

(57) ABSTRACT

A vehicular automatic transmission TM has a torque converter TC connected to the engine E and an automatic transmission mechanism (gear trains 13a, 13b, 14a, 14b) connected to the output side of the torque converter, the drive power from the engine for which gear shifting is performed via the torque converter and the automatic transmission mechanism is transmitted to the wheels and the vehicle is driven. The control apparatus for this automatic transmission mechanism has a towing state presumption device that presumes based on the driving conditions that the vehicle is in a towing state, and a lockup engagement increase mechanism that increases the degree of engagement of the lockup clutch of the torque converter when it is determined via the towing state determination device that the vehicle is in a towing state.

6 Claims, 12 Drawing Sheets

VEHICULAR AUTOMATIC TRANSMISSION APPARATUS

FIELD OF THE INVENTION

The present invention pertains to a vehicular automatic transmission that drives a vehicle to move by converting and transmitting the output from the engine, and more specifically, to an apparatus that controls the automatic transmission for a vehicle that traveling while towing a trailer or the like.

BACKGROUND OF THE INVENTION

As a vehicular automatic transmission, a mechanism that combines a torque converter with a transmission mechanism (such as a gear-type transmission mechanism) is applied to practical use in the conventional art. In this automatic transmission, shift control (also known as speed ratio control or ratio control) (1), in which shifting is automatically carried out in accordance with the degree of engine (drive source) throttle opening and the vehicular speed, such that the vehicle starts in a low speed range, and gradual upward shifting is thereafter performed as the driving speed increases until the highest speed range is reached when the vehicle is cruising at a high speed, is generally performed.

Sometimes, a trailer, camper or the like is attached to and towed behind a vehicle having this type of automatic transmission (the unit being towed in this fashion shall be generally referred to as a 'trailer, etc.'). When a trailer, etc. is being towed in this fashion, because the towing load is added to the vehicle, when a load is being towed a type of transmission control different from that performed during normal driving must be performed.

Accordingly, Japanese Patent Laid-Open No. 61-135881 discloses a transmission control apparatus that includes a detector comprising a switch that detects whether or not a trailer is hooked up to a hitch used for trailer towing, and where it is detected by this detector that a trailer is hooked up to the trailer towing hitch, the a gear position of the transmission is controlled to a prescribed low-speed range position. In addition, Japanese Patent Laid-Open No. 8-164832 discloses a limit switch that is mounted to a coupler that connects the trailer [to the vehicle] and detects the towing weight, such that the towing weight detected by this limit switch is used to control the force applied by a retarder or a secondary brake.

Incidentally, where a trailer, etc. is being towed at high speed on a flat road (referred to below as 'high-speed cruising'), the driving load is higher than when no trailer, etc. is being towed. As a result, the problem occurs that high-load and high-RPM driving occurs while the speed ratio of the torque converter is less than 1.0, thereby increasing the heat generated by the torque converter or the like, and consequently the transmission fluid in the transmission can easily become hot. Moreover, due to the changes in load that occur during high-load driving, the problems arise that (1) the internal temperature of the transmission itself increases and (2) the feeling of enjoyment during driving decreases due to frequent shifting of speed ranges upward or downward and frequent changes in the ON/OFF status of the torque converter lockup clutch.

SUMMARY OF THE INVENTION

An object of the present invention is to provide an automatic transmission control apparatus that enables comfortable high-speed cruising while preventing the transmission fluid temperature from increasing even when a trailer, etc. is being towed during such high-speed cruising.

In the present invention, the vehicular automatic transmission comprises a torque converter that is connected to a drive source (such as the engine E in the embodiment hereof) and an automatic transmission mechanism that is connected to the output side of this torque converter, and the drive power from the drive source for which speed range shifting is performed via the torque converter and the automatic transmission mechanism is transmitted to the wheels and propels the vehicle. The control apparatus for this automatic transmission mechanism has towing state presumption means that presumes based on the vehicle's driving conditions that the vehicle is in a towing state, and a lockup engagement increase mechanism that increases the degree of engagement of the lockup clutch of the torque converter when it is presumed via the towing state presumption means that the vehicle is in a towing state.

The towing state presumption means can be constructed such that it determines whether or not the vehicle is in a towing state based on the driving load on the vehicle, the shift frequency, the frequency of operation of the lockup clutch, changes in vehicular speed, or changes in the throttle opening amount, and the means employed in this embodiment that calculates the towing mode determination counter integrated value STRCNT, for example, is equivalent to such means.

According to the vehicular automatic transmission control apparatus pertaining to the present invention having the construction described above, because the degree of engagement of the lockup clutch of the torque converter is increased (i.e., it is engaged tightly) where it is presumed by the towing state presumption means based on the additional towing load that the vehicle is in a towing state when, for example, the vehicle is being driven at high-speed cruising while towing a trailer, the amount of slippage in the torque converter is reduced, such that the amount of heat generated by the torque converter is reduced, and an increase in the temperature of the transmission fluid is inhibited.

It is also acceptable if the control apparatus of the present invention is constructed such that (1) shifting to the highest speed range is prohibited when it is presumed by the towing state presumption means that the vehicle has entered a towing state, (2) where the current speed range is the highest speed range, control is performed to shift down to a lower speed range, or (3) the degree of engagement of the lockup clutch is increased by the lockup engagement increase mechanism when it is presumed by the towing state presumption means that the vehicle has entered a towing state even after a shift down is performed.

Because setting of [the transmission] to the highest speed range is prohibited and the highest speed range in which the vehicle can be driven is the speed range at least one speed range lower than the highest speed range when it is presumed by the towing state presumption means that the vehicle has entered a towing state, the control apparatus having the construction described above reduces the drive torque of the torque converter and the driving load thereon, thereby reducing the amount of heat generated by the torque converter. Where the vehicle subsequently remains in the towing state, the degree of engagement of the lockup clutch of the torque converter is increased, the amount of slippage in the torque converter is limited, and the amount of heat generated thereby is accordingly reduced. As a result, the amount of heat generated in the transmission while in the towing state is reduced in stages, and overheating of the transmission fluid can be effectively prevented.

Where shifting down is to be performed based on the presumption by the towing state presumption means that the vehicle is in a towing state while being driven at the highest speed range, it is preferred that the shift down be carried out only after the accelerator pedal is pressed or a shift down instruction is issued. In this way, the shift down can be performed without a lurching feeling.

Furthermore, when the vehicle is stopped while it is presumed by the towing state presumption means that the vehicle is in a towing state and driving is thereafter resumed, it is preferred that the presumption regarding the vehicle's towing state be carried out based on a decrease in the transmission fluid temperature during the period that the vehicle is stopped. This enables appropriate control to be performed after the vehicle has been stopped temporarily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by way of illustration only and thus, are not limitative of the present invention.

DESCRIPTION OF THE PREFERRED EMBODIMENTS

Figure 1:
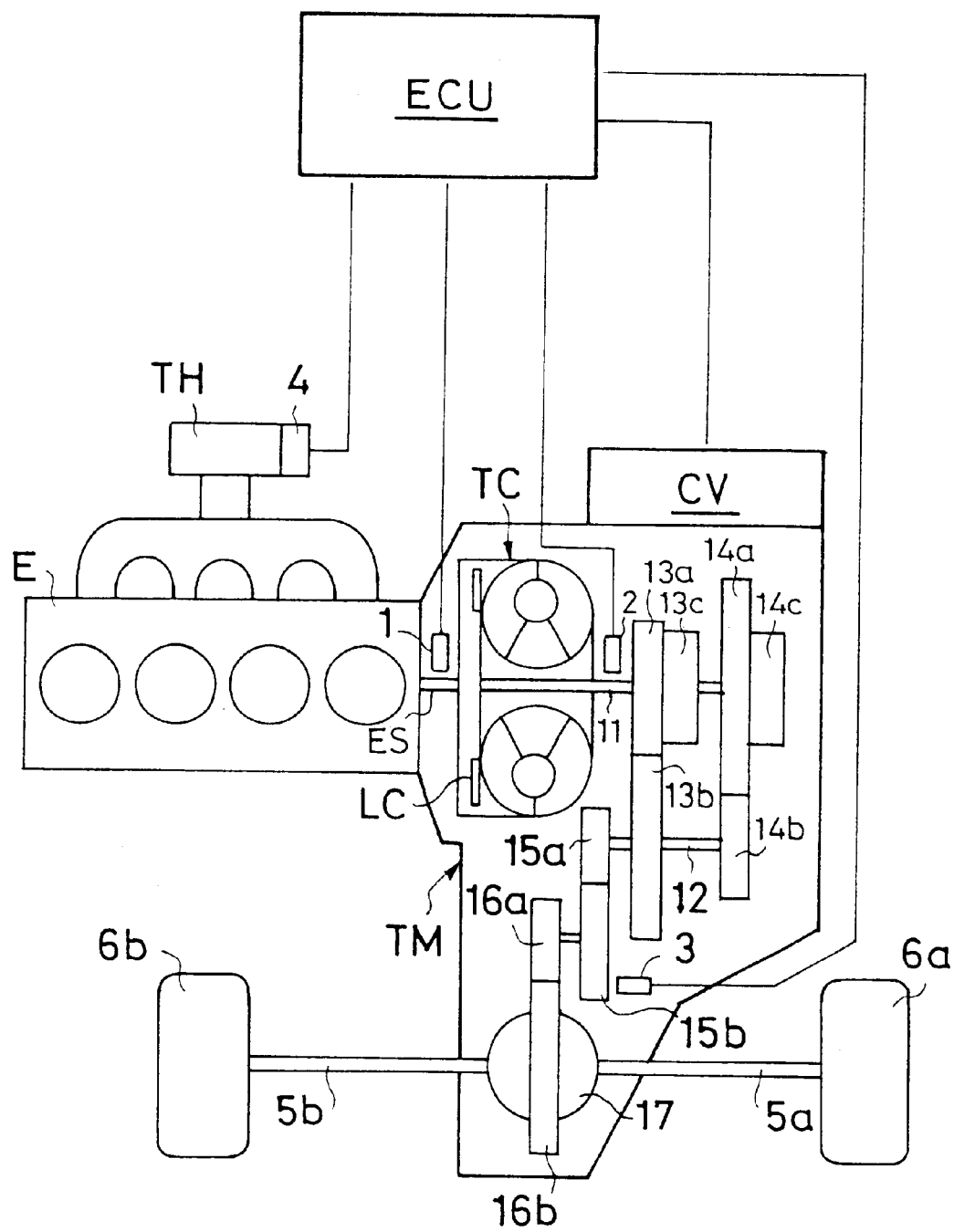
FIG. 1 is a summary drawing showing the construction of the vehicular automatic transmission and associated control apparatus pertaining to the present invention.

Preferred embodiments of the present invention will be described below with reference to the drawings. The construction of the vehicular automatic transmission having the control apparatus pertaining to the present invention is shown in FIG. 1. The drive power transmission apparatus having this automatic transmission TM drives the vehicle by converting the output rotation of the engine E and transmitting it from the axle shafts 5a and 5b to the left and right wheels 6a and 6b. Furthermore, a trailer, etc. can be hooked up to the rear end of and towed by the vehicle.

The transmission TM is connected to the engine E such that the rotation of the output shaft Es is transmitted to the transmission TM. The transmission TM comprises a torque converter TC connected to the output shaft Es of the engine E and a gear-type transmission mechanism connected to the output side of the torque converter TC. The gear-type transmission mechanism has a transmission input shaft 11 that is connected to the output side of the torque converter TC and a transmission countershaft 12 that is located parallel to the transmission input shaft 11, and multiple gear trains are located between the transmission input shaft 11 and the transmission countershaft 12. The torque converter TC comprises a lockup clutch LC that can directly connect an input member (impeller) and an output member (turbine).

While the typical vehicular transmission has multiple gear trains corresponding to vehicular speed ranges (for example, in this embodiment, there are five gear trains for five forward speed ranges), for ease of explanation, only a first gear train 13a/13b and a second gear train 14a/14b are shown in this gear-type transmission mechanism. In these gear trains, drive gears 13a and 14a are respectively mounted to the transmission input shaft 11, and can engage and disengage with the transmission input shaft 11 via the shift clutches 13c and 14c. The drive gears 13a and 14a and driven gears 13b and 14b that respectively engage therewith are connected to the transmission countershaft 12. As a result, when either of the shift clutches 13c or 14c is selectively engaged, drive transmission is carried out via the first gear train 13a/13b or the second gear train 14a/14b. Where neither of the shift clutches 13c or 14c is engaged, the transmission is in neutral, and no drive transmission is carried out between the transmission output shaft 11 and the transmission countershaft 12.

A shift control valve CV is used to control the engagement of these shift clutches 13c and 14c, and engagement of these clutches is controlled through control of the supply of engagement operation hydraulic pressure from the speed ratio valve CV to the shift clutches 13c and 14c. The operation of the shift control valve CV is controlled through an internal electromagnetic valve, the operation of the electromagnetic valve is controlled based on control signals issued from an electronic control unit ECU, and the supply of engagement operation hydraulic pressure to the shift clutches 13c and 14c is thereby controlled. The automatic transmission TM in this embodiment has five gear trains for forward motion, and shifting among five forward speed ranges is automatically carried out through the selective use of one of these gear trains via the shift control valve.

An output drive gear 15a is connected to the transmission countershaft 12, and an output transmission gear train comprising an output driven gear 15b that engages with this output drive gear 15a, a final drive gear 16a that is located coaxially with the output driven gear 15a [(2)] and rotates together therewith, and a final driven gear 16b that engages with this final drive gear 16a is located as shown in the drawing. The final driven gear 16b is permanently engaged with a differential mechanism 17, and the wheels 6a and 6b are connected to the axle shafts 5a and 5b that are connected to and extend outward from the differential mechanism 17.

In the drive transmission apparatus having the above construction, detection signals from a throttle sensor 4 that detects the throttle opening amount θTH of the engine throttle apparatus TH, detection signals from an engine rotation sensor 1 that detects the rotations .(i.e., the rotations input to the torque converter TC) Ne of the engine output shaft Es, detection signals from a transmission input rotation sensor 2 that detects the rotations output from the torque converter TC (i.e., the rotations of the transmission input shaft 11), and detection signals from a transmission output rotation sensor 3 that detects the rotations of the transmission output shaft 16, are input to the electronic control unit ECU that controls the operation of the control valve CV.

The control valve CV performs automatic shift control by controlling clutch engagement and disengagement in the gear-type transmission mechanism, and controls the engagement of the lockup clutch LC, and the operation of this control valve CV is controlled by the electronic control unit ECU. In this invention, the control performed by the electronic control unit ECU when the vehicle is being driven at high-speed cruising while towing a trailer has certain characteristics, and the nature of this control will be explained below.

Figure 3:
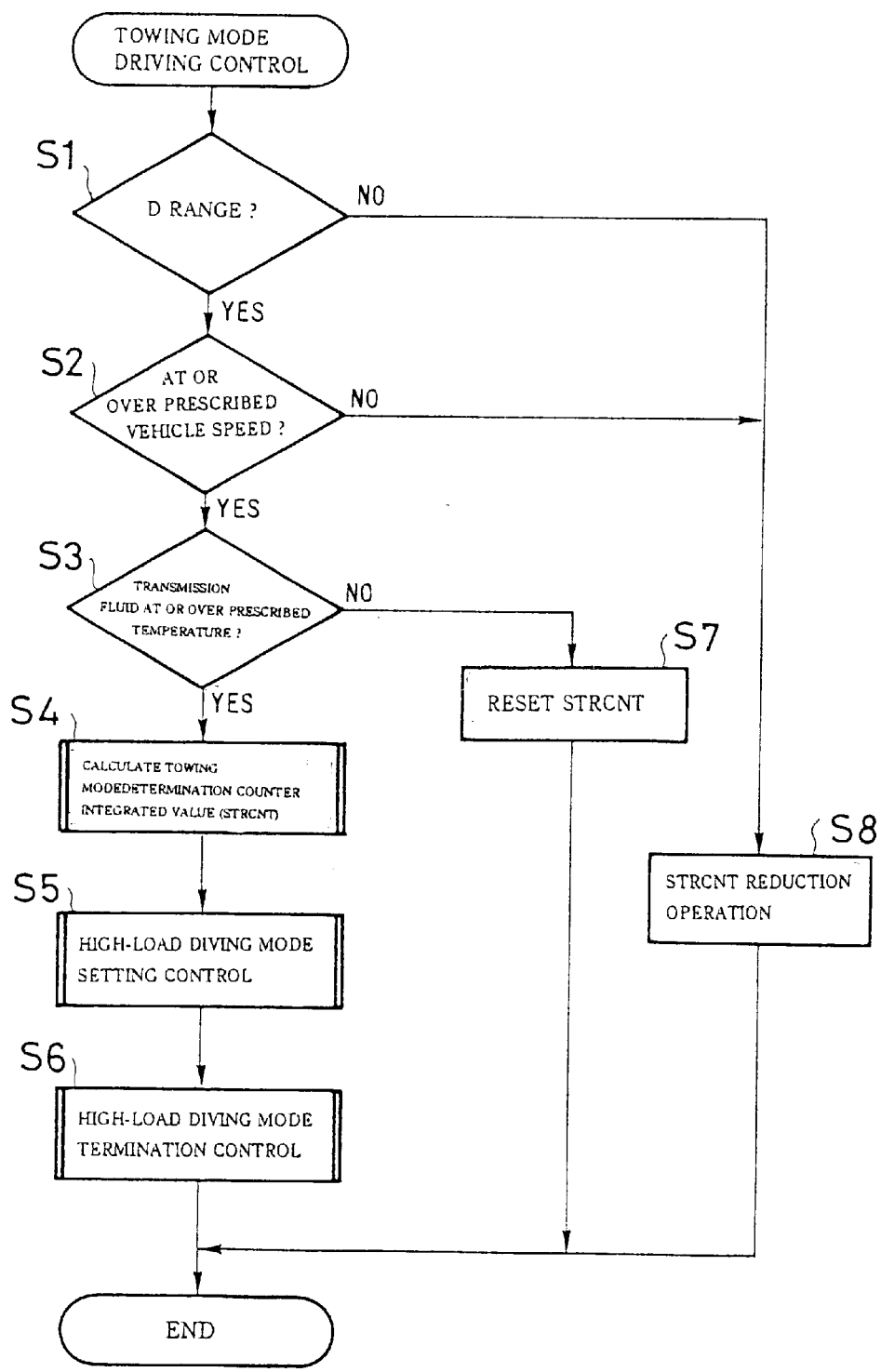
FIG. 3 is a flow chart showing the sequence of the towing mode drive control process carried out by the control apparatus.

In this control, where the vehicle is being driven at high-speed cruising while towing a trailer, shift control and lockup clutch engagement control are performed so that the transmission fluid temperature is prevented from overheating, and this control is carried out in accordance with the flow chart shown in FIG. 3. First, it is determined whether or not [the transmission] is in the D range (i.e., the D5, D4 or D3 ranges)(step S1), and if the transmission is in some other range, such as the 2 range, the L range, the N range or the R range, an operation to reduce the towing mode determination counter integrated value STRCNT in prescribed increments is performed (step S8). If [the transmission] is in the D range, on the other hand, [the electronic control unit ECU] advances to step S2 and determines whether or not the current vehicular speed V equals or exceeds a prescribed vehicular speed (for example, it determines whether or not the vehicle is in a high-speed state of 80 Km/H or higher), and if the current vehicular speed is below the prescribed vehicular speed, [the electronic control unit ECU] advances to step S8 and performs an operation to reduce the towing mode determination counter integrated value STRCNT in prescribed increments. The reduction value for each reduction in step S8 is set in accordance with a table (map) based on the relationship between the calculated road surface slope value and the vehicular speed. The reduction value corresponding to the calculated road surface slope value and the dynamic average value for the vehicular speed is read out and sought from this table.

If the vehicular speed V equals or exceeds the prescribed vehicular speed, it is determined that the vehicle is being driven at high-speed cruising in the D range, and it is determined in step S3 whether or not the current transmission fluid temperature equals or exceeds a prescribed temperature. If the current transmission fluid temperature does not equal or exceed the prescribed temperature, because there is no danger that the transmission fluid will overheat, [the electronic control unit ECU] advances to step S7 and the towing mode determination counter integrated value STRCNT is reset to zero.

If the current transmission fluid temperature equals or exceeds the prescribed temperature, [the electronic control unit ECU] advances to step S4, the towing mode determination counter integrated value STRCNT is calculated, and high-load driving mode setting control (step S5) and high-load driving mode termination control (step S6) are carried out based on the calculated towing mode determination counter integrated value STRCNT.

Figure 4:
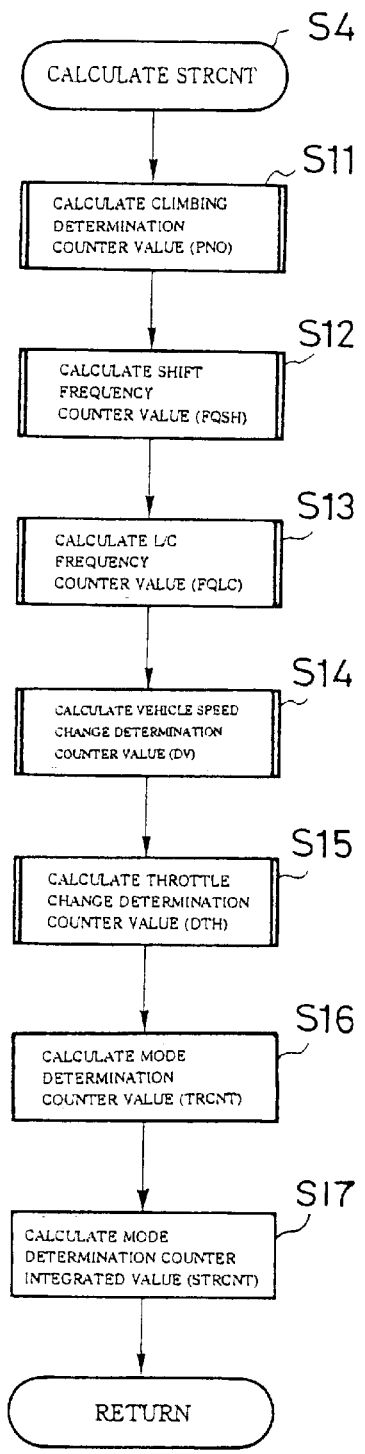
FIG. 4 is a flow chart showing the sequence of the calculation control process carried out to calculate the towing mode determination counter integrated value STRCNT.
Figure 5:
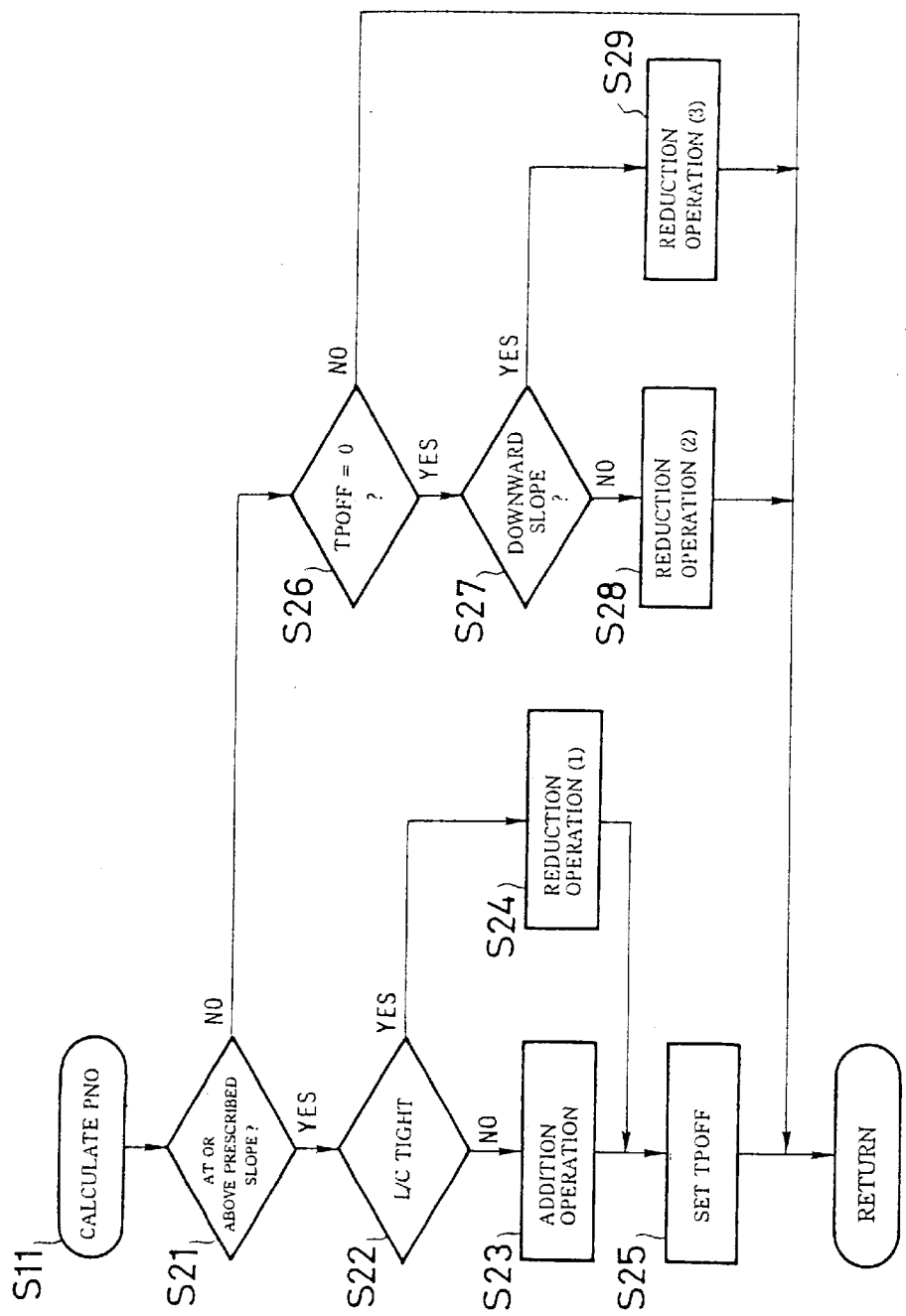
FIG. 5 is a flow chart showing the sequence of the calculation control process carried out to calculate the climbing determination counter value.

First, the sequence of the control of the calculation of the towing mode determination counter integrated value STRCNT carried out in step S4 will be explained with reference to FIG. 4. First, the climbing determination counter value PNO is calculated (step S11). The sequence of this calculation control process is shown in FIG. 5. First, it is determined in step S21 whether or not the current road surface slope equals or exceeds a prescribed slope. In order to detect this travelling road surface slope, a table or map that indicates the relationship between the engine throttle opening amount and vehicular speed (and vehicular acceleration) and the travelling road surface slope is preset or pre-calculated and loaded [into the electronic control unit ECU], and the road surface slope corresponding to the current throttle opening amount and vehicular speed (and vehicular acceleration) is read out and sought from this table.

However, the pre-loaded road surface slope table (map) shows values that apply where the driven vehicle has a prescribed weight and nothing is being towed, and where a trailer, etc. is being towed, the towing load can be understood as the surface road slope. For example, when the vehicle is being driven on a flat road while towing a trailer, even though the road surface is flat, it is determined based on the towing load from the trailer, etc. that the vehicle is being driven on a sloping road surface having a prescribed slope. As a result, it can conversely be presumed from the road surface slope determined in this manner whether the vehicle is towing a trailer. Accordingly, in step S21 the road surface slope is detected and it is determined whether or not the vehicle is being driven while towing a trailer.

Where it is determined that the travelling road surface slope equals or exceeds a prescribed slope, i.e., where it is determined that the driven vehicle may be towing a trailer, [the electronic control unit ECU] advances to step S22, in which it is determined whether or not the lockup clutch LC of the torque converter TC is tightly engaged. If the lockup clutch LC is tightly engaged, because there is no slippage of the torque converter TC and the amount of internal heat generation is minimal, [the electronic control unit ECU] advances to step S24 and the calculation operation (1) is performed in which the climbing determination counter value PNO is reduced by a prescribed amount. This reduction value is set in the form of a table (map) based on the relationship between the calculated road surface slope value and the vehicular speed, and the reduction value corresponding to the calculated road surface slope value and the dynamic average value for the vehicular velocity is read out and sought from this table.

However, if it is determined in step S22 that the lockup clutch LC is not tightly engaged, because the likelihood that heat will be generated internally due to slippage in the torque converter TC, [the electronic control unit ECU] advances to step S23 and an operation to add a prescribed amount to the climbing determination counter value PNO is performed. This addition value is also set in the form of a table (map) based on the relationship between the road surface slope value and the vehicular speed, and the addition value corresponding to the calculated road surface slope value and the dynamic average value for the vehicular velocity is read out and sought from this table.

When the addition operation (step S23) or the reduction operation (1) (step S24) is performed in this way, the count operation wait timer TPOFF is set in step S25.

On the other hand, if it is determined in step S21 that the road surface slope is less than the prescribed slope, [the electronic control unit ECU] advances to step S26 and waits for the count operation wait timer TPOFF to elapse. It is then determined in step S27 whether or not the road surface slope is a downward slope. If it is not a downward slope, i.e., if the slope is a rising slope that does not equal or exceed the prescribed slope, the reduction operation (2) of step S28 is performed, while if it is a downward slope, the reduction operation (3) of step S29 is performed. The reduction operation (2) and (3) are alike in that the reduction value corresponding to the calculated road surface slope value and the dynamic average value for the vehicular speed is read out from a reduction value table (map) set based on the relationship between the calculated road surface slope value and the vehicular speed, and reduction processing is carried out accordingly, but different values are set in the two tables. Specifically, the table used in the reduction operation (3) of step S29 contains larger reduction values.

As described above, the climbing determination counter value PNO is a value that is increased where the lockup clutch is not tightly engaged and the generation of heat in the torque converter TC is large when the vehicle is towing a trailer and the driving load is high, and is reduced in other situations. As can be understood from this description, when the climbing determination counter value PNO becomes large, it is presumed that [the transmission] is in high-load driving mode.

Figure 6:
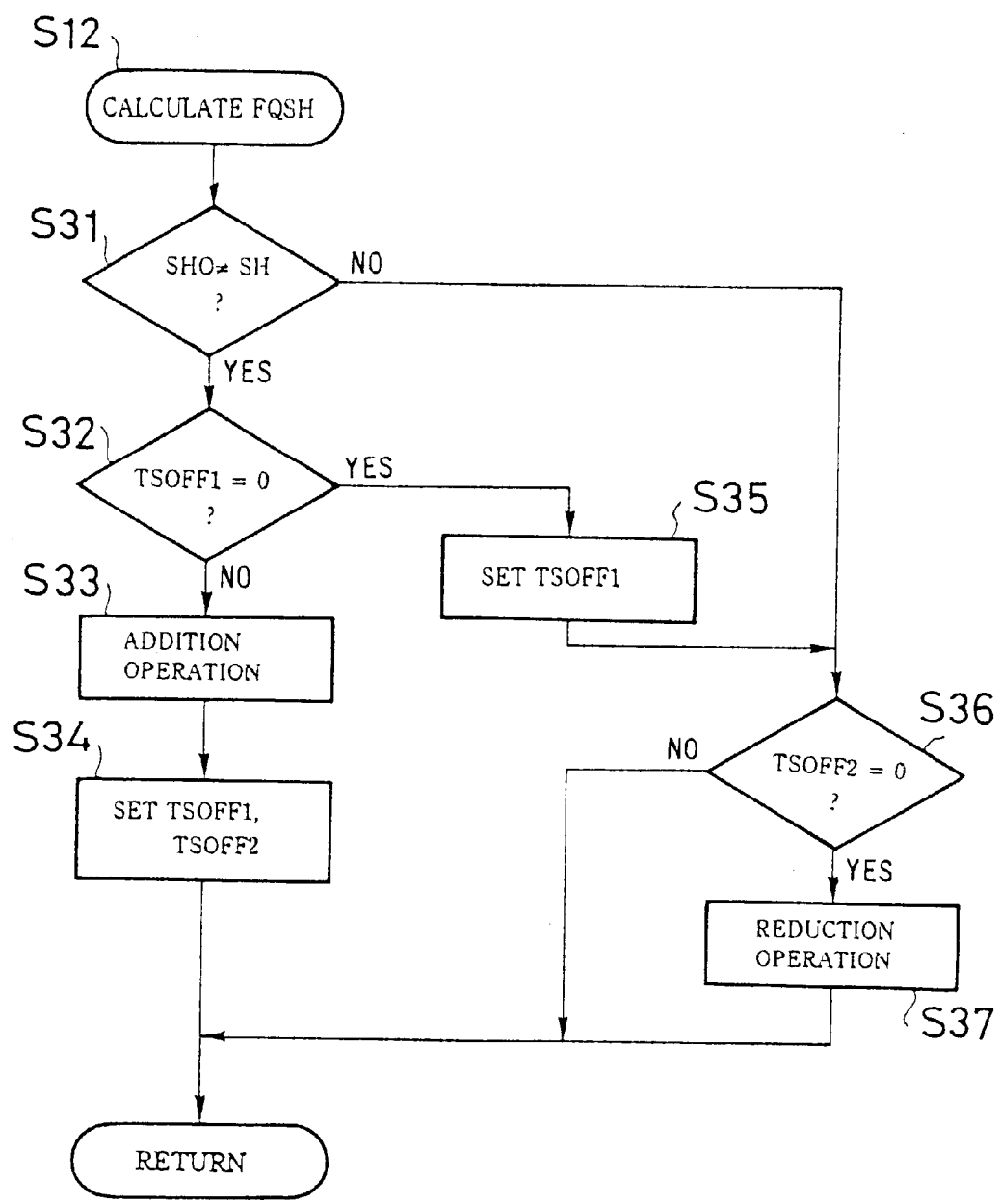
FIG. 6 is a flow chart showing the sequence of the calculation control process carried out to calculate the shift frequency counter value.

When the climbing determination counter value PNO is calculated in this way in step S11, [the electronic control unit ECU] advances to step S12 and the shift frequency counter value FQSH is calculated. The sequence for this calculation is shown in FIG. 6. First, it is determined in step S31 whether or not the current speed range instruction value SH matches the previous speed range instruction value SHO, i.e., whether or not the shift corresponding to the output shift instruction has been carried out. If SH≠SHO, i.e., if the shift has been carried out, [the electronic control unit ECU] advances to step S32, and it is determined whether or not the first shift determination timer TSOFF1 has elapsed, i.e., whether or not the amount of time set in that timer has elapsed since the previous shift.

Where the current shift is performed before the first shift determination timer TSOFF1 has elapsed since the previous shift, indicating frequent shifting, because there is a high likelihood of increased heat generation from the clutch due to such shifting, [the electronic control unit ECU] advances to step S33 and an operation to add a prescribed amount to the shift frequency counter value FQSH is performed. This addition value is set in the form of a table (map) based on its relationship to the transmission fluid temperature, and the addition value corresponding to the current transmission fluid temperature is read out from the table and sought. [The electronic control unit ECU] then advances to step S34 and prescribed values are set in the first shift determination timer TSOFF1 and the second shift determination timer TSOFF2.

However, where it is determined in step S31 that SH=SHO, [the electronic control unit ECU] advances directly to step S36. Furthermore, where it is determined in step S32 that the current shift has been performed after the first shift determination timer TSOFF1 has elapsed since the previous shift, the first shift determination timer TSOFF1 is set to a prescribed value and [the electronic control unit ECU] advances to step S36. In step S36, it is determined whether or not the second shift determination timer TSOFF2 has elapsed. If it has not yet elapsed, because the current shift is still underway, neither the addition operation nor the reduction operation is performed. If the second shift determination timer TSOFF2 has elapsed, because the shift frequency is not unduly high, [the electronic control unit ECU] advances to step S37 and an operation to reduce the shift frequency counter value FQSH by a prescribed amount is performed. This reduction value is set in the form of a table (map) based on its relationship to the transmission fluid temperature, and the reduction value corresponding to the current transmission fluid temperature is read out and sought from the table.

Figure 7:
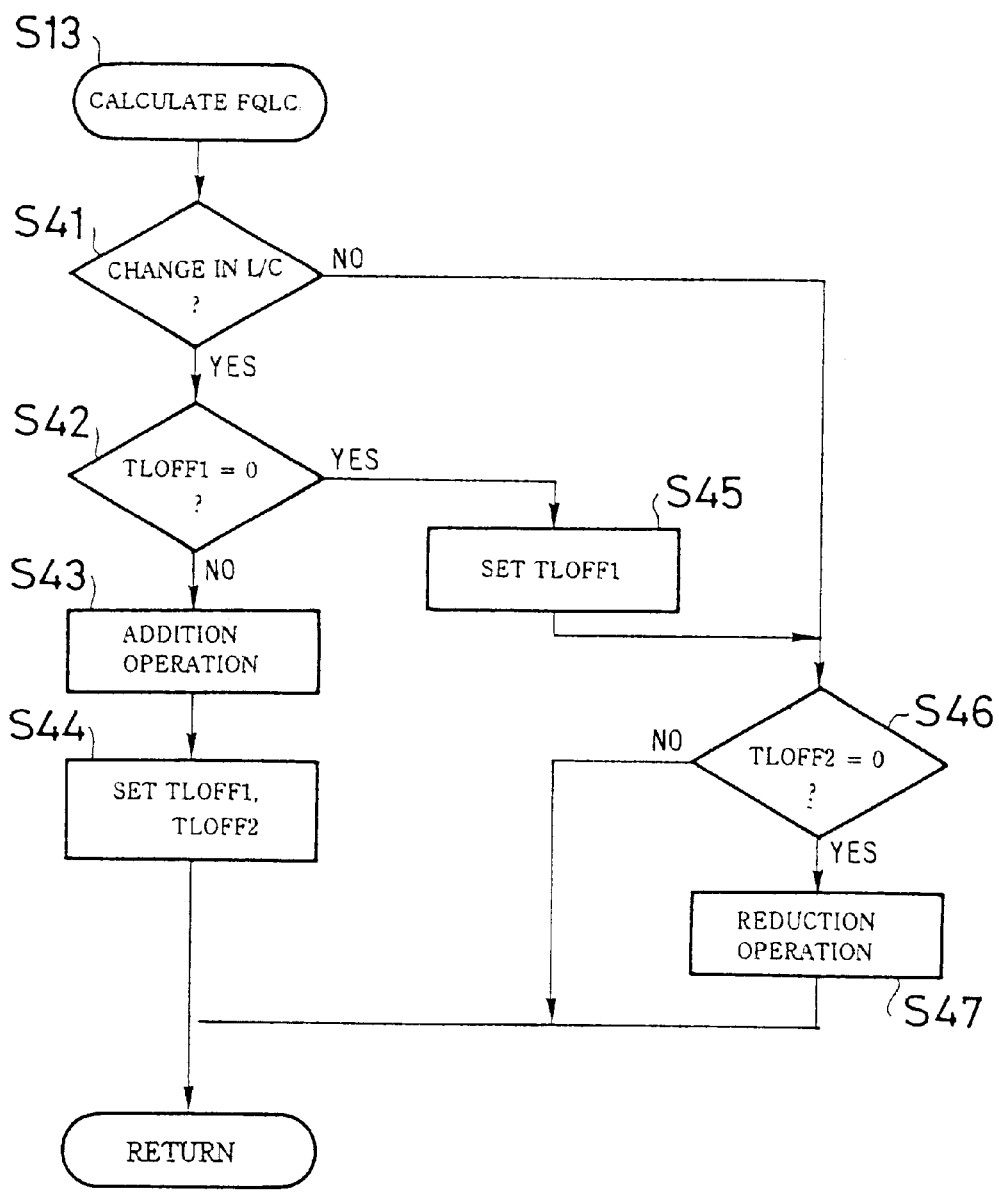
FIG. 7 is a flow chart showing the sequence of the calculation control process carried out to calculate the L/C frequency counter value.

When the calculation of the shift frequency counter value FQSH has been performed in step S12 as described above, [the electronic control unit ECU] advances to step S13 and the L/C frequency counter value FQLC is calculated. The sequence for this calculation is shown in FIG. 7. First, it is determined in step S41 whether or not the engagement control signals for the lockup clutch LC have changed. If the engagement control signals have changed, [the electronic control unit ECU] advances to step S42 and it is determined whether or not the first lockup determination timer TLOFF1 has elapsed, i.e., whether or not an amount of time equal to or exceeding this timer's set time interval has elapsed since the moment at which the previous engagement control signal change.

Where the current signal change has occurred before the first lockup determination timer TLOFF1 has elapsed since the previous signal change, indicating frequent issuance of lockup engagement control change instructions, because there is a high likelihood of increased heat generation from the lockup clutch LC and inside the torque converter TC due to such lockup engagement changes, [the electronic control unit ECU] advances to step S43 and an operation to add a prescribed amount to the lockup frequency counter value FQLC is performed. This addition value is set in the form of a table (map) based on its relationship to the transmission fluid temperature, and the addition value corresponding to the current transmission fluid temperature is read out and sought from the table. [The electronic control unit ECU] then advances to step S44 and prescribed values are set in the first lockup determination timer TLOFF1 and the second lockup determination timer TLOFF2.

However, where it is determined in step S41 that there has been no change in the lockup clutch engagement control signals, [the electronic control unit ECU] advances directly to step S46. Furthermore, where it is determined in step S42 that the current signal change has occurred after the first lockup determination timer TSOFF1 has elapsed since the previous signal change, the first lockup determination timer TSOFF1 is set to a prescribed value and [the electronic control unit ECU] advances to step S46. In step S46, it is determined whether or not the second lockup determination timer TLOFF2 has elapsed. If it has not yet elapsed, because the current lockup engagement control is still underway, neither the addition operation nor the reduction operation is performed. If the second lockup determination timer TLOFF2 has elapsed, on the other hand, because the engagement control change frequency is not unduly high, [the electronic control unit ECU] advances to step S47 and an operation to reduce the lockup shift frequency counter value FQLC[3] by a prescribed amount is performed. This reduction value is set in the form of a table (map) based on its relationship to the transmission fluid temperature, and the reduction value corresponding to the current transmission fluid temperature is read out and sought from the table.

Figure 8:
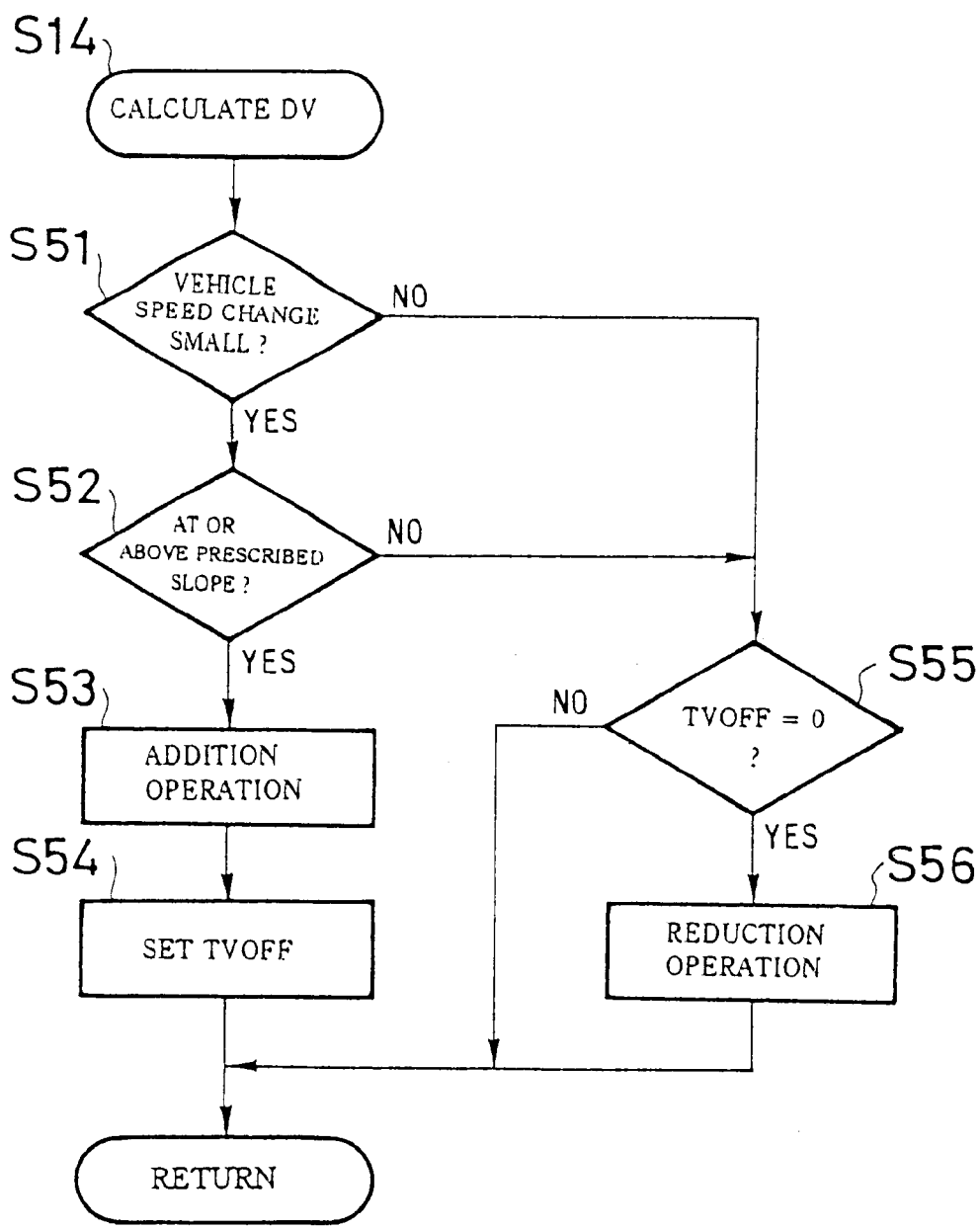
FIG. 8 is a flow chart showing the sequence of the calculation control process carried out to calculate the vehicular speed change determination counter value.

When the calculation of the L/C frequency counter value FQLC has been performed in step S13 as described above, [the electronic control unit ECU] advances to step S14 and the vehicular speed change determination counter value DV is calculated. The sequence for this calculation is shown in FIG. 8. First, it is determined in step S51 whether or not the change in vehicular speed (the dynamic average value of the vehicular speed change) is small. The vehicular speed change is deemed to be small when the vehicle is being driven at high-speed cruising. In such a case, [the electronic control unit ECU] advances to step S52, wherein it is determined whether or not the travelling road surface slope equals or exceeds a prescribed slope, i.e., whether or not the driving load is large.

Where the travelling road surface slope equals or exceeds a prescribed slope, because there is a high likelihood that the vehicle is being driven at high-speed cruising while in a towing state and that there is a high likelihood of increased internal generation of heat in the transmission, [the electronic control unit ECU] advances to step S53 and an operation to add a prescribed amount to the vehicular speed change determination counter value DV is performed. This addition value is set in the form of a table (map) based on its relationship to the transmission fluid temperature, and the addition value corresponding to the current transmission fluid temperature is read out and sought from the table. [The electronic control unit ECU] then advances to step S54 and a prescribed value is set in the vehicular speed change determination timer TVOFF.

However, where it is determined in step S51 that the vehicular speed change is large, [the electronic control unit ECU] advances directly to step S55. Furthermore, [the electronic control unit ECU] also advances to step S55 where it is determined in step S52 that the road surface slope being driven is less than the prescribed slope. In step S55, it is determined whether or not the vehicular speed change determination timer TVOFF has elapsed. If it has not yet elapsed, the electronic control unit ECU will not go to step S56, because it is possible that the vehicular speed change is only temporary. The electronic control unit ECU advances to step S56 only if it is determined that the vehicular speed change determination timer TVOFF has elapsed in step 55, and an operation to reduce the vehicular speed change determination counter value DV by a prescribed value is performed in step S56. This reduction value is set in the form of a table (map) based on its relationship to the transmission fluid temperature, and the reduction value corresponding to the current transmission fluid temperature is read out and sought from the table.

Figure 9:
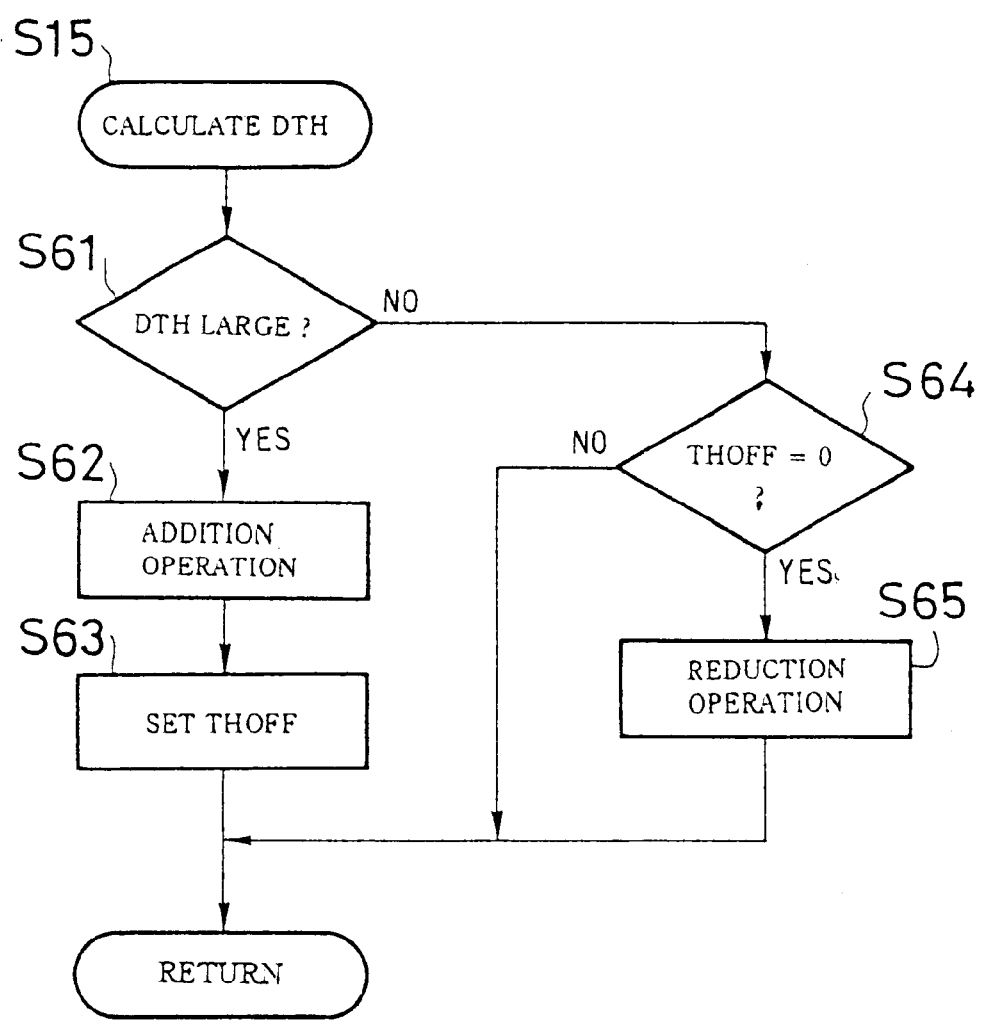
FIG. 9 is a flow chart showing the sequence of the calculation control process carried out to calculate the throttle change determination counter value.

When the calculation of the vehicular speed change determination counter value DV has been performed in step S14 as described above, [the electronic control unit ECU] advances to step S15 and the throttle change determination counter value DTH is calculated. The sequence for this calculation is shown in FIG. 9. First, it is determined in step S61 whether or not the throttle change (the dynamic average value of the throttle change) is large. The throttle opening amount is deemed to be essentially constant when the vehicle is being driven at high-speed cruising. In such a case, [the electronic control unit ECU] advances to step S62, and an operation to add a prescribed amount to the throttle change determination counter value DTH is performed. This addition value is set in the form of a table (map) based on its relationship to the transmission fluid temperature, and the addition value corresponding to the current transmission fluid temperature is read out and sought from the table. [The electronic control unit ECU] then advances to step S54[5] and a prescribed value is set in the throttle change determination timer TVOFF.

However, where it is determined in step S61 that the throttle change is large, [the electronic control unit ECU] advances directly to step S64 and it is determined whether or not the throttle change determination timer THOFF has elapsed. If it has not yet elapsed, the electronic control unit ECU will not go to step S65 because it is possible that the throttle change is only temporary. The electronic control unit ECU advances to step S65 only if it is determined that the throttle change determination timer THOFF has elapsed in step 64, and an operation to reduce the throttle change determination counter value DV by a prescribed value is performed in step S65. This reduction value is set in the form of a table (map) based on its relationship to the transmission fluid temperature, and the reduction value corresponding to the current transmission fluid temperature is read out and sought from the table.

After the climbing determination counter value PNO, the shift frequency counter value FQSH, the L/C frequency counter value FQLC, the vehicular speed change determination counter value DV and the throttle change determination counter value DTH are calculated in steps S11 through S15 as described above, these counter values are added together and a towing mode determination counter value TRCNT is calculated (step S16). In addition, a towing mode determination counter integrated value STRCNT is calculated via integration of the counter value TRCNT (step S17).

Figure 10:
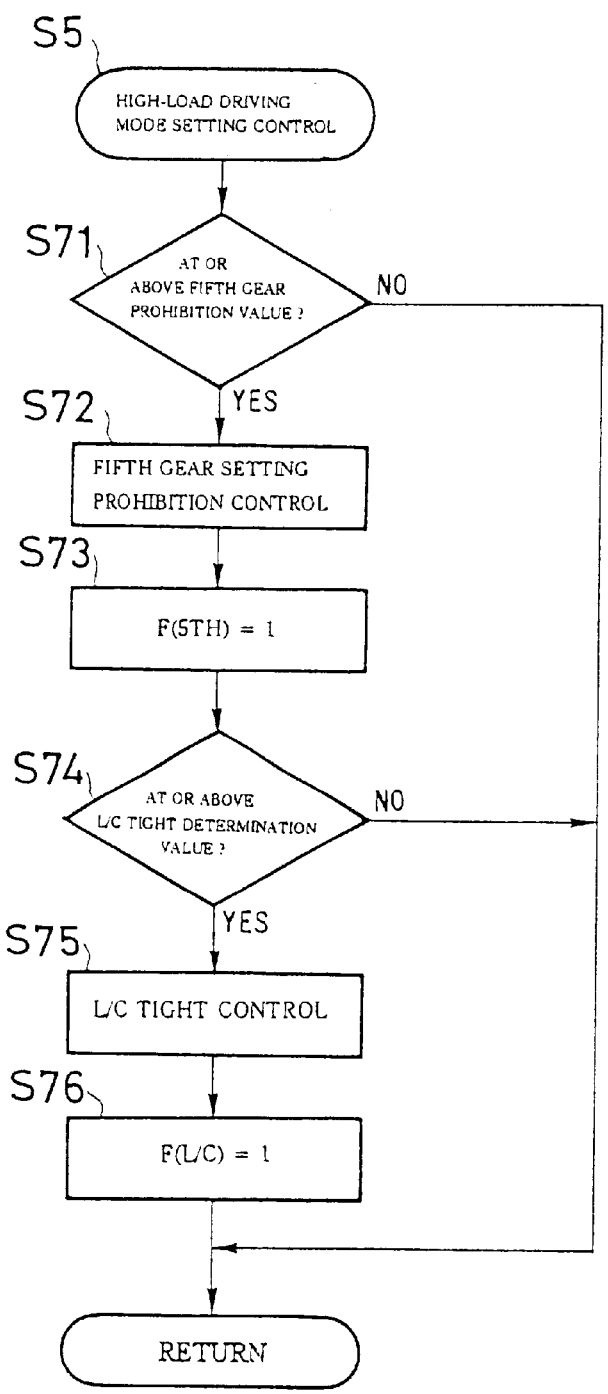
FIG. 10 is a flow chart showing the sequence of the high-load driving mode setting control process.

Once the towing mode determination counter integrated value STRCNT shown in step S4 in FIG. 3 is calculated as described above, high-load driving mode setting control is carried out in step S5 based on the value of this towing mode determination counter integrated value STRCNT. The sequence of this control is shown in FIG. 10, and will be explained below with additional reference to the time chart of FIG. 2. In this time chart, in which time is indicated on the horizontal axis, the addition to obtain the towing mode determination counter integrated value STRCNT begins at time t0, and the time change characteristics of each value are shown where the towing mode determination counter integrated value STRCNT gradually increases.

In this control, first, it is determined in step S71 whether or not the towing mode determination counter integrated value STRCNT equals or exceeds the fifth gear prohibition value TRCNT(1). As can be seen from the explanation provided above, the towing mode determination counter integrated value STRCNT calculated in step S4 is an integrated value that is derived by adding counter values corresponding to the factors behind the rise in the transmission fluid temperature where the vehicle is being driven at high-speed cruising while towing a trailer, and it can be deemed that the transmission fluid temperature rises higher as this value increases. For example, in the situation shown in FIG. 2, the addition operation of step S4 begins at time t0 and the towing mode determination counter integrated value STRCNT gradually increases, and at time t1, this value exceeds the fifth gear prohibition value TRCNT(1).

Figure 11:
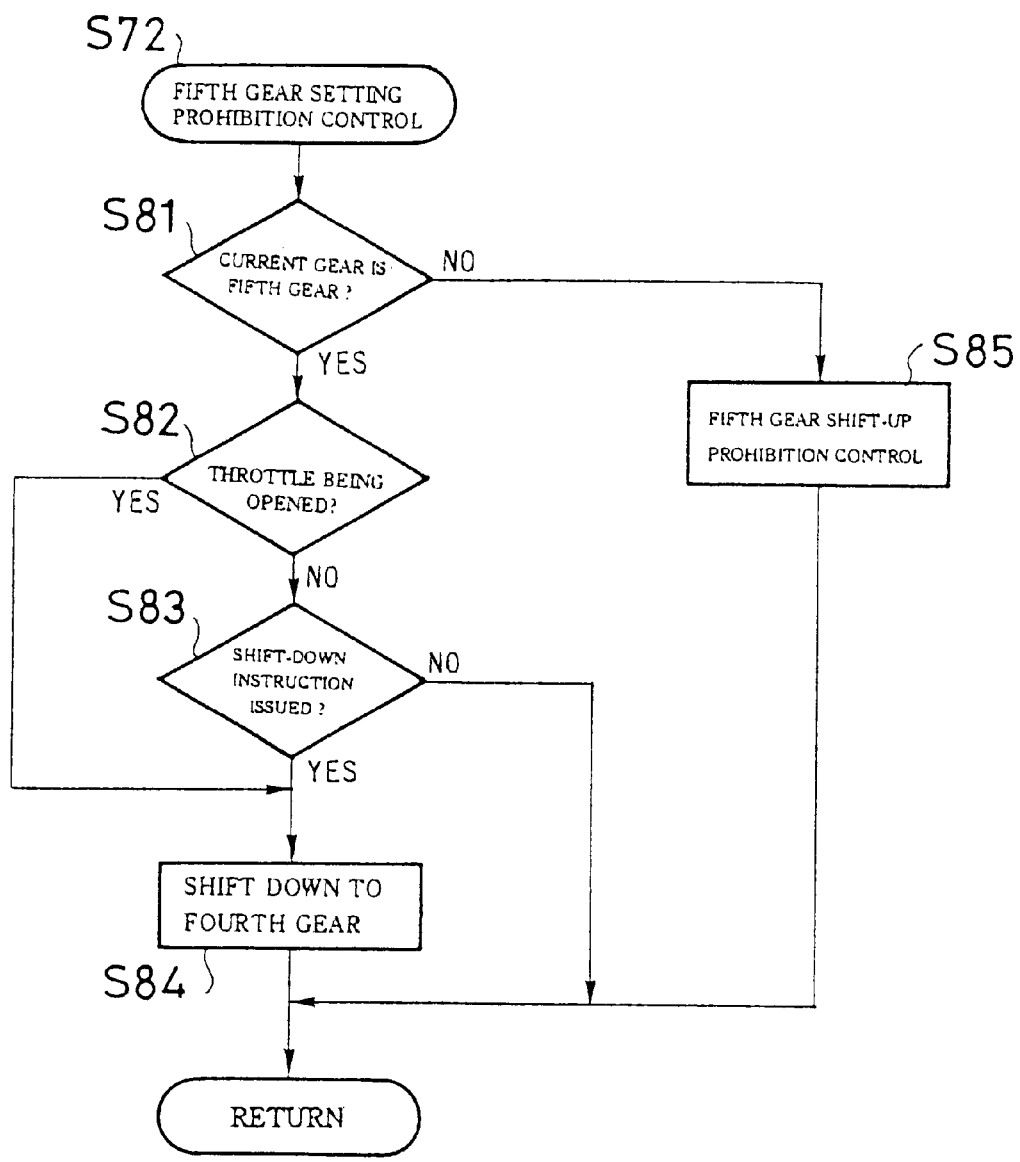
FIG. 11 is a flow chart showing the sequence of the fifth gear prohibition control process.

As a result, during the period until time t1, the control carried out beginning with step S71 comes to an end without any further processing, but after time t1, [the electronic control unit ECU] advances from step S71 to step S72 and fifth gear prohibition control is carried out. The sequence of this control is shown in FIG. 11. This control prevents setting [of the transmission] to fifth gear (i.e., the fifth speed range). Where the vehicle is being driven in fifth gear, [the transmission] is shifted down to fourth gear, and where the vehicle is being driven in the fourth gear or below, [the transmission] is prevented from shifting up to fifth gear.

To carry out this control, first, it is determined in step S81 whether or not the current speed range is fifth gear. If the current gear is not fifth gear, the electronic control unit ECU advances to step S85, and control is subsequently performed to prevent shifting up into the fifth gear. If the vehicle is being driven in fifth gear, it is determined in step S82 whether or not the accelerator pedal was pressed (i.e., whether the throttle opening amount increased), and more specifically, it is determined whether or not the throttle opening amount increased by a prescribed level or more during a prescribed time interval. If the accelerator pedal was pressed, [the electronic control unit ECU] advances to step S84 and a shift down to fourth gear is carried out. If the accelerator pedal was not pressed, it is determined in step S83 whether or not a shift down instruction (for example, a shift down instruction due to operation of the shift lever, or a shift down instruction due to slowing vehicular speed) was issued, and if a shift down instruction was issued, [the electronic control unit ECU] advances to step S84 and a shift down to fourth gear is carried out.

When fifth gear setting prohibition control (step S72) is begun as described above, the fifth gear setting prohibition flag F(5$^{th}$) is raised at this point in time (step S73). Because the fifth gear setting prohibition control is begun and the fifth gear setting prohibition flag F(5$^{th}$) is raised after the pressing of the accelerator pedal or the issuance of a shift down instruction, which occurs after the towing mode determination counter integrated value STRCNT exceeds the fifth gear prohibition value TRCNT(1) at the time t1 as described above, the fifth gear setting prohibition flag F(5$^{th}$) is raised at time t2 in the time chart.

If driving while towing a trailer (i.e., the towing state) continues even after the fifth gear setting prohibition control is begun and the towing mode determination counter value TRCNT remains a positive value, each addition operation described above continues and the towing mode determination counter integrated value STRCNT gradually increases. In response, where it is determined that the towing mode determination counter integrated value STRCNT equals or exceeds the L/C tight determination value TRCNT(2) (step S74), [the electronic control unit ECU] advances to step S75, wherein control to tightly engage the lockup clutch LC of the torque converter TC is performed (at time t3 on the time chart) and the LC tight setting flag F(L/C) is raised.

If the towing mode determination counter value TRCNT thereafter becomes a negative value, such as where the vehicle is then driven on a downward slope, thereby reducing the driving load (time t4), a mode is entered in which the generation of heat inside the transmission decreases, and therefore a reduction operation may be performed in connection with the calculation of the towing mode determination counter integrated value STRCNT. This reduction operation is begun at time t5, after the counter calculation delay timer has elapsed. The maximum value of the towing mode determination counter integrated value STRCNT is set in advance, and addition operations do not increase such value beyond the maximum value.

Figure 2:
FIG. 2 is a time chart showing the changes over time of various characteristics where the automatic transmission is being controlled by the control apparatus.
Figure 12:
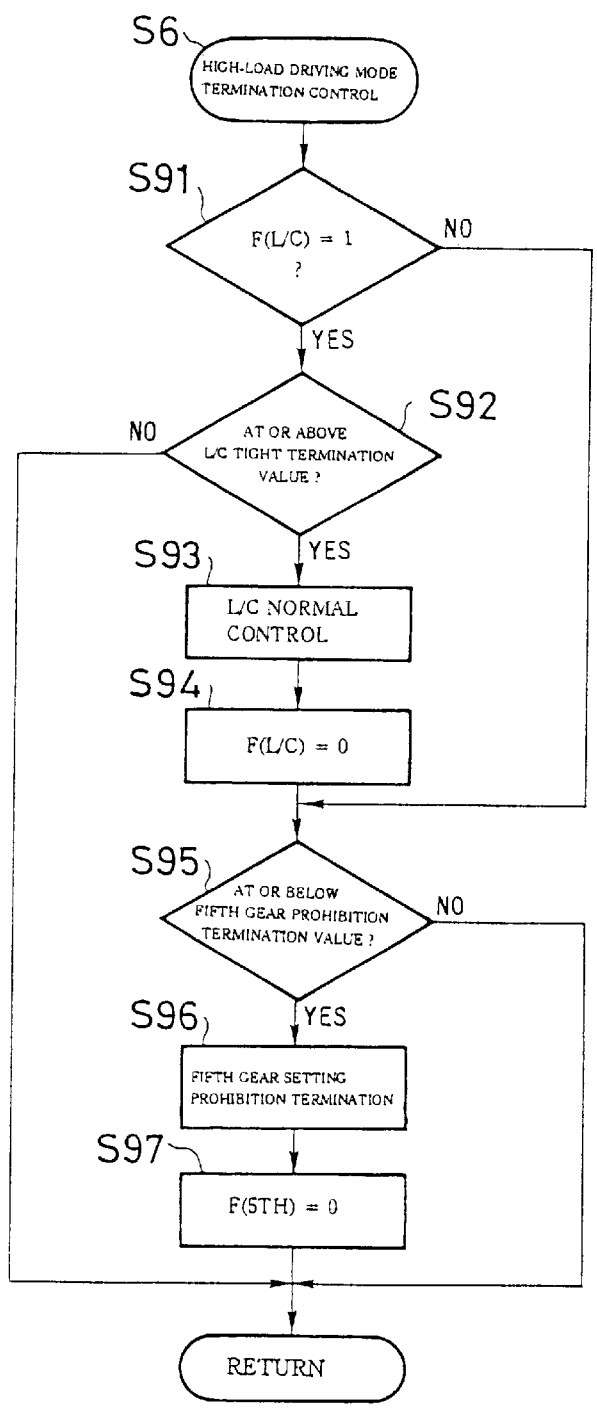
FIG. 12 is a flow chart showing the sequence of the high-load driving mode termination control process.

When a reduction operation is begun at time t5, the control changes to the high-load driving mode termination control of step S6 shown in FIG. 3. The sequence of this control will be explained below with reference to FIG. 12. First, it is determined whether or not the L/C tight setting flag F(L/C) has been raised (i.e., whether or not F(L/C)=1) (step S91), and if F(L/C)=1, [the electronic control unit ECU] advances to step S92, wherein it is determined whether or not the towing mode determination counter integrated value STRCNT is less than or equal to the L/C tight termination value TRCNT(3). As shown in FIG. 2, as a result of the reduction process described above, the towing mode determination counter integrated value STRCNT is less than or equal to the L/C tight termination value TRCNT(3) at time t6. Consequently, [the electronic control unit ECU] advances to steps S93 and S94 at this time, the lockup clutch LC engagement control is returned to normal control, and the L/C tight setting flag F(L/C) is returned to '0'.

However, the lockup clutch LC engagement control is returned to normal control at time t7, as shown in FIG. 2, when the accelerator pedal is pressed or a shift down instruction is issued after the towing mode determination counter integrated value STRCNT becomes less than or equal to the L/C tight termination value TRCNT(3) at time t6.

When the lockup clutch LC engagement control has been returned to normal control and the L/C tight setting flag F(L/C) has been returned to '0' as described above, [the electronic control unit ECU] advances from step S91 to step S95, and it is determined whether the towing mode determination counter integrated value STRCNT has become less than or equal to the fifth gear setting prohibition termination value TRCNT(4). If the towing mode determination counter integrated value STRCNT has become less than or equal to the fifth gear setting prohibition termination value TRCNT(4) (time t8), [the electronic control unit ECU] advances to steps S96 and S97, in which the fifth gear setting prohibition control is terminated and the fifth gear setting prohibition flag F(5$^{th}$) is returned to '0'.

When the control described above is being performed, the vehicle may be stopped, the ignition switch turned OFF, and the engine stopped while the towing mode determination counter integrated value STRCNT is a prescribed value. In such a case, the handling of the towing mode determination counter integrated value STRCNT becomes an issue when the ignition switch is subsequently turned ON, the engine restarted and the vehicle driven once more. Consequently, the value of the towing mode determination counter integrated value STRCNT and the transmission fluid temperature when the ignition switch is turned OFF are stored in memory. The transmission fluid temperature is then detected when the ignition switch is turned ON, that temperature is compared with the stored temperature, the change in the temperature is sought, and a reduction operation is performed to correct the towing mode determination counter integrated value STRCNT in response to the change in temperature. In this way, the towing mode determination counter integrated value STRCNT can always be set to the appropriate value corresponding to the current transmission fluid temperature even when the vehicle is stopped temporarily for rest, and effective control can be carried out even after the engine is restarted.

As described above, the vehicular automatic transmission control apparatus pertaining to the present invention has towing state presumption means that presumes based on the operating conditions that the vehicle is in a towing state, as well as a lockup engagement increase mechanism that increases the degree of engagement of the lockup clutch of the torque converter when it is determined via the towing state determination means that the vehicle is in a towing state. The towing state presumption means is constructed such that, for example, the vehicle is presumed to be in a towing state when the driving load increases due to the towing of a trailer, etc. behind the vehicle being driven.

According to the vehicular automatic transmission control apparatus pertaining to the present invention having the construction described above, because the degree of engagement of the lockup clutch of the torque converter is increased (i.e., it is engaged tightly) where it is presumed by the towing state presumption means based on the additional towing load that the vehicle is in a towing state when, for example, the vehicle is being driven at high-speed cruising while towing a trailer, the amount of slippage in the torque converter is reduced, such that the amount of heat generated by the torque converter is reduced, and an increase in the temperature of the transmission fluid is inhibited.

It is also acceptable if the control apparatus of the present invention is constructed such that (1) shifting to the highest speed range is prohibited when it is presumed by the towing state presumption means that the vehicle has entered a towing state, (2) where the current speed range is the highest speed range, control is performed to shift down to a lower speed range, or (3) the degree of engagement of the lockup clutch is increased by the lockup engagement increase mechanism when it is presumed by the towing state presumption means that the vehicle has entered a towing state even after a shift down is performed.

Because setting of [the transmission] to the highest speed range is prohibited and the highest speed range in which the vehicle can be driven is the speed range at least one speed range lower than the highest speed range when it is presumed by the towing state presumption means that the vehicle has entered a towing state, the control apparatus having the construction described above reduces the drive torque of the torque converter and the driving load thereon, thereby reducing the amount of heat generated by the torque converter. Where the vehicle subsequently remains in the towing state, the degree of engagement of the lockup clutch of the torque converter is increased, the amount of slippage in the torque converter is limited, and the amount of heat generated thereby is accordingly reduced. As a result, the amount of heat generated in the transmission while in the towing state is reduced in stages, and overheating of the transmission fluid can be effectively prevented.

Furthermore, it is preferred that the towing state presumption means determine whether or not the vehicle is in a towing state based on the driving load on the vehicle, the shift frequency, the frequency of operation of the lockup clutch, changes in vehicular speed or changes in the throttle opening amount. In this way, the existence of a towing state due to the towing of a trailer, etc. can be accurately and reliably determined.

Where shifting down is to be performed based on the presumption by the towing state presumption means that the vehicle is in a towing state while being driven at the highest speed range, it is preferred that the shift down be carried out only after the accelerator pedal is pressed or a shift down instruction is issued. In this way, the shift down can be performed without a lurching feeling.

Furthermore, when the vehicle is stopped while it is presumed by the towing state presumption means that the vehicle is in a towing state and driving is thereafter resumed, it is preferred that the presumption regarding the vehicle's towing state be carried out based on a decrease in the transmission fluid temperature during the period that the vehicle is stopped. This enables appropriate control to be performed after the vehicle has been stopped temporarily.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2001-193035 filed on Jun. 26, 2001, which is incorporated herein by reference.

What is claimed is:

1. A control apparatus for a vehicular automatic transmission that has a torque converter connected to a drive source and an automatic transmission mechanism connected to an output side of said torque converter, and performs driving of a vehicle with wheels by transmitting, to the wheels, drive power from said drive source, through said torque converter and said automatic transmission mechanism, wherein said control apparatus comprises:
    towing mode presumption means that presumes that said vehicle is in a towing state in which the vehicle is towing a trailer based on the driving conditions of said vehicle;
    and a lockup engagement increase mechanism that increases the degree of engagement of a lockup clutch of said torque converter when it is presumed by said towing mode presumption means that said vehicle is in a towing state,
    wherein when it is presumed by said towing state presumption means that said vehicle is in a towing state, said automatic transmission mechanism is prevented from shifting into a highest speed range, and if the vehicle is being driven in the highest speed range, is shifted down into a lower speed range.

2. The vehicular automatic transmission control apparatus according to claim 1, wherein said towing state presumption means determines whether or not said vehicle is in said towing state based on a driving load on said vehicle, a shift frequency, a frequency of operation of the lockup clutch, changes in vehicular speed or changes in a throttle opening amount.

3. The vehicular automatic transmission control apparatus according to claim 1, wherein when it is presumed by said towing state presumption means that said vehicle is still in a towing state after said shift-down, said lockup engagement increase mechanism further increases the amount of engagement of said lockup clutch.

4. The vehicular automatic transmission control apparatus according to claim 1, wherein when it is presumed by said towing state presumption means that said vehicle is in a towing state while the vehicle is travelling in the highest gear and shift-down is to be performed, the shift-down is carried out only after an accelerator pedal is pressed or a shift-down instruction is issued.

5. A control apparatus for a vehicular automatic transmission that has a torque converter connected to a drive source and an automatic transmission mechanism connected to an output side of said torque converter, and performs driving of a vehicle with wheels by transmitting, to the wheels, drive power from said drive source, through said torque converter and said automatic transmission mechanism, wherein said control apparatus comprises:
    towing mode presumption means that presumes that said vehicle is in a towing state in which the vehicle is towing a trailer based on the driving conditions of said vehicle;
    and a lockup engagement increase mechanism that increases the degree of engagement of a lockup clutch of said torque converter when it is presumed by said towing mode presumption means that said vehicle is in a towing state,
    wherein said towing state presumption means seeks a travelling road surface slope in a non-towing state based on a throttle opening amount and changes in vehicular speed, and presumes the existence of a towing state from said travelling road surface slope.

6. A vehicular control apparatus for a automatic transmission that has a torque converter connected to a drive source and an automatic transmission mechanism connected to an output side of said torque converter, and performs driving of a vehicle with wheels by transmitting, to the wheels, drive power from said drive source, through said torque converter and said automatic transmission mechanism, wherein said control apparatus comprises: towing mode presumption means that presumes that said vehicle is in a towing state in which the vehicle is towing a trailer based on the driving conditions of said vehicle;

and a lockup engagement increase mechanism that increases the degree of engagement of a lockup clutch of said torque converter when it is presumed by said towing mode presumption means that said vehicle is in a towing state, wherein when said vehicle is stopped while it is presumed by said towing state presumption means that said vehicle is in a towing state and driving is thereafter resumed, the presumption as to said vehicle's towing state is carried out based on a decrease in a transmission oil temperature during the period that said vehicle is stopped.

* * * * *